(12) United States Patent
Nosella

(10) Patent No.: US 7,428,214 B2
(45) Date of Patent: Sep. 23, 2008

(54) METHODS AND DEVICES FOR HIGH NETWORK AVAILABILITY

(75) Inventor: Thomas Nosella, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/794,880

(22) Filed: Mar. 4, 2004

(65) Prior Publication Data
US 2005/0195754 A1 Sep. 8, 2005

(51) Int. Cl.
*H04L 12/26* (2006.01)
(52) U.S. Cl. .................. 370/228; 370/227; 370/216; 709/224
(58) Field of Classification Search ......... 370/216–228, 370/242, 244, 254, 255
See application file for complete search history.

(56) References Cited

U.S. PATENT DOCUMENTS

| | | | | |
|---|---|---|---|---|
| 6,108,300 | A | 8/2000 | Coile et al. ................. | 370/217 |
| 6,330,599 | B1* | 12/2001 | Harvey ........................ | 709/223 |
| 6,487,591 | B1 | 11/2002 | Budhraja et al. ........... | 709/223 |
| 6,658,595 | B1 | 12/2003 | Thamattoor .................. | 714/11 |
| 6,701,449 | B1* | 3/2004 | Davis et al. .................... | 714/4 |
| 6,704,795 | B1 | 3/2004 | Fernando et al. ........... | 709/237 |
| 6,717,909 | B2* | 4/2004 | Leroux et al. ............... | 370/228 |
| 6,745,347 | B1* | 6/2004 | Beardsley et al. ............ | 714/43 |
| 6,850,997 | B1* | 2/2005 | Rooney et al. ................ | 710/38 |
| 6,885,635 | B1* | 4/2005 | Haq et al. .................... | 370/219 |
| 6,895,531 | B2* | 5/2005 | Suzuki et al. ................. | 714/43 |
| 7,318,095 | B2* | 1/2008 | Husain et al. ............... | 709/224 |
| 2003/0012135 | A1* | 1/2003 | Leroux et al. ............... | 370/228 |
| 2005/0053073 | A1* | 3/2005 | Kloth et al. ............ | 370/395.41 |
| 2005/0074027 | A1* | 4/2005 | Natarajan et al. ........... | 370/468 |

OTHER PUBLICATIONS

International Search Report and Written Opinion Of The International Searching Authority dated May 20, 2005, for related PCT Application No. PCT/US05/06091.
Chinese First Office Action for Application No. 20058006868.1 issued Mar. 14, 2008 (ANDIP040.CN).

* cited by examiner

*Primary Examiner*—Wing F. Chan
*Assistant Examiner*—Michael J Moore, Jr.
(74) *Attorney, Agent, or Firm*—Weaver Austin Villeneuve & Sampson LLP

(57) ABSTRACT

Methods and devices are provided for simulating a direct failure between a network device and an end device. In some implementations, the network device is a gateway of a first network and the end device is a host or a storage device on the first network. In some implementations, the network device includes a linked interface, the administrative and/or operational state of which is determined by the operational state of one or more tracked interfaces. The tracked interfaces may be in the same network device or other network devices, and may be physical or virtual. In some such implementations, when a tracked interface fails, the linked interface will bring down a link between the network device and the end device, thereby causing a switchover to a redundant path. Other implementations involve direct notification of the network device that the link has failed or is about to fail.

20 Claims, 9 Drawing Sheets

METHODS AND DEVICES FOR HIGH NETWORK AVAILABILITY

BACKGROUND OF THE INVENTION

1. Field of the Invention

The present invention relates to high availability in networks. More specifically, the present invention relates to methods and devices for detecting the failure of an active path or paths and switching over to a standby or remaining active path.

2. Description of Related Art

Customers often need to replicate data from a first location to a second location in real time. This is desirable, for example, to allow for a recovery from a data loss event such as a downed primary data center, an extended power outage, natural disaster, etc.: if data are stored in the second location, a customer may more readily recover from a disaster in the first location. Data are transmitted between the first and second locations via a path through an intervening network (e.g., a private WAN facility). If the path fails, the data are transmitted via a redundant path.

Normally, the determination of when to switch over to a redundant path is made by a device in the first location, which may be a host, a storage device, etc. This determination is based upon sets of timers that are used to expire a potentially failed transaction on the path. For example, "keepalive" or similar messages are often exchanged between devices in the first and second locations to discover if the end service and network transport is available. If a "keepalive" message is not received within a timer period, a switchover to the redundant path is triggered. The "keepalive" mechanism is required due to the fact that no direct linkage exists between the end device and the network transport to signal a broken path. Therefore, it is the responsibility of the end devices to detect the failed network path using mechanisms such as "keepalive." In general, the timer periods are quite long (e.g., 60 to 180 seconds), because it is undesirable to switch unnecessarily to the redundant path or experience any flapping of the service between two feasible paths.

It is therefore desirable to provide methods and apparatus for improving the speed and accuracy of making a determination of when it is necessary to switch over from a primary data path to a redundant data path connecting client devices across an intervening network. It would be desirable if such methods and devices could be used with a variety of client devices and with a range of protocols.

SUMMARY OF THE INVENTION

Methods and devices are provided for simulating a direct failure between a network device and an end device based on an actual upstream failure in the path between two end devices. In some implementations, the network device is a gateway of a first network and the end device is a host or a storage device on the first network. In some implementations, the network device includes a linked interface, the administrative state of which is determined by the operational state of one or more tracked interfaces. The tracked interfaces may be in the same network device or other network devices along an active path between two or more end devices, and may be physical or virtual. In some such implementations, when a tracked interface fails, the linked interface will bring down a link between the network device and the end device, thereby causing a switchover to a redundant path. Other implementations involve direct notification of the network device that the link has failed or is about to fail.

Some implementations of the invention provide a method of maintaining high availability in a network. The method includes the step of deriving a state of a linked interface of a first network device from the operational state of a first tracked interface, wherein the linked interface and the first tracked interface form part of a first data path between a first end device and a second end device. The method also includes the step of notifying the first end device of the state of the linked interface. The state of the linked interface may be an administrative state or an operational state. The notifying step may involve notifying the end device of a failure in the first data path, for example by bringing down the first data pathway. The method may include the step of switching to a second data pathway.

The method may also include the step of deriving the state of the linked interface from the operational state of at least a second tracked interface. The state of the linked interface may be determined by the use of a weighting function applied to at least the first tracked interface and the second tracked interface. The deriving step may involve applying a damping function to a recovery of the linked interface.

Some embodiments of the invention provide a network device that includes a first tracked interface having an operational state and a linked port configured to derive a linked port state from the operational state of the tracked interface. The linked port and the first tracked interface form part of a first data path between a first end device and a second end device. The linked port may be further configured to notify the first end device when the linked port state is a down state.

The first tracked interface may be a physical interface or a virtual interface. The first tracked interface may be one of a Fibre Channel interface or an Ethernet interface. The first tracked interface may be part of the network device or part of another network device.

The linked port may be a Fibre Channel port. The linked port may be further configured to drop a connection with the first end device when the linked port state is a down state. The linked port state may be determined by applying a weighting function to the first tracked interface and a second tracked interface. The linked port state may be determined by applying a damping function to an operational state. The network device may also include a routing table, wherein the linked port state is based upon an update in the routing table.

Alternative implementations of the invention provide a method of maintaining high availability in a network. The method includes the following steps: receiving a signal indicating a condition of a first data path between a first end device and a second end device; deriving a state of a linked port of a first network device from the signal, the linked port forming part of the first data path; and notifying the first end device of the state.

The condition of the receiving step may indicate that the first data path is down. The condition of the receiving step may indicate that the first data path will be down at a future time. The notifying step may involve dropping a link between the first network device and the first end device.

Alternative embodiments of the invention provide a computer program embodied in a machine-readable medium. The computer program includes instructions for controlling at least one device to perform the following steps: deriving a state of a linked interface of a first network device from the operational state of a first tracked interface, the linked interface and the first tracked interface forming part of a first data path between a first end device and a second end device; and notifying the first end device of the state of the linked interface.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will mainly be described in the context of communications between two or more storage area networks that use the Fibre Channel protocol. However, it should be noted that the techniques of the present invention can be applied to a variety of different protocols and networks. Further, the solutions afforded by the invention are equally applicable to non-Fibre Channel networks. In the following description, numerous specific details are set forth in order to provide a thorough understanding of the present invention. The present invention may be practiced without some or all of these specific details. In other instances, well known process operations have not been described in detail in order not to obscure the present invention.

Figure 1:
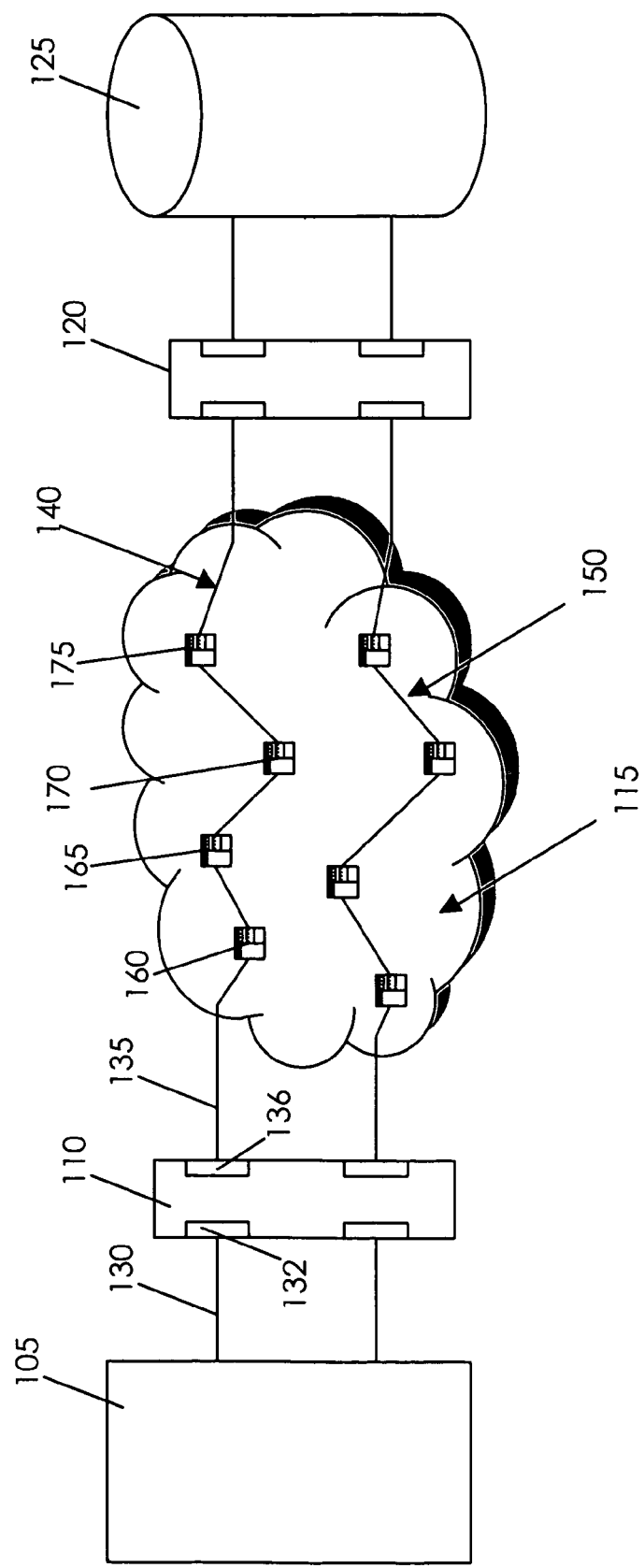
FIG. 1 is a network diagram that illustrates some implementations of the invention.

FIG. 1 is a simplified network diagram that will be used to describe some implementations of the present invention. Client device 105 of FIG. 1 communicates with client device 125 via an intervening network 115 (here, Internet 115). Client device 105 may be a host, a storage device, or a similar device. Client device 125 is, or at least includes, a storage device. As will be described in more detail below, client devices 105 and 125 may be, for example, devices within storage area networks in separate geographic locations.

Data may be transmitted between devices 105 and 125 according to the Small Computer System Interface ("SCSI") standard or by other protocols. For example, data may be transferred according to the Fiber Connection ("FICON") standard or the Enterprise System Connection ("ESCON") standard.

Network 115 may be any type of network suitable for efficient communication between devices 105 and 125, such as a metro optical transport or the Internet. Accordingly, a variety of protocols may be used for communication on network 115, such as Internet Protocol ("IP"), Fibre Channel ("FC"), FC over IP ("FCIP"), Internet SCSI ("iSCSI," an IP-based standard for linking data storage devices over a network and transferring data by carrying SCSI commands over IP networks) or Dense Wavelength Division Multiplexing ("DWDM," an optical technology used to increase bandwidth over existing fiber optic backbones).

Gateway 110 is a network device (e.g., a switch) disposed between device 105 and network 115. Similarly, gateway 120 is a network device disposed between device 125 and network 115.

As noted above, clients often desire to replicate data from a first location (e.g., device 105 to a second location (e.g., device 125) in real time. Here, path 140 is a primary data path from device 105 to device 125, via network 115. In this example, link 130 is formed between device 105 and port 132 of gateway 110. Similarly, link 135 is formed between port 135 and network 115.

Network devices 160, 165, 170 and 175 form part of path 140. As will be understood by those of skill in the art, network devices 160, 165, 170 and 175 are merely illustrative of a number of network devices along path 140 and within network 115. If some part of path 140 fails, device 105 causes a switchover and data are transmitted between devices 105 and 125 via redundant path 150.

According to some implementations of the invention, methods and devices are provided for simulating a direct failure between a network device such as gateway 110 and an end device such as device 105. The network device includes a linked interface (such as port 132), the administrative state of which is determined by the operational state of one or more tracked interfaces. The tracked interfaces may be in the same network device (e.g., port 136) or other network devices, and may be physical or virtual. In some implementations, when a tracked interface fails, the linked interface will bring down a link between the network device and the end device (e.g., link 130), thereby causing a switchover to a redundant path (e.g., path 150).

As noted in more detail below, a damping function (or similar algorithm) may be applied, such that a tracked interface must remain in a "down" state for a predetermined period of time before a linked interface reaches a "down" administrative state and brings the link down. When a primary link includes multiple paths operating in parallel, a weighting function or metric may be applied to determine the administrative state of the linked interface when one such path fails.

Figure 2:
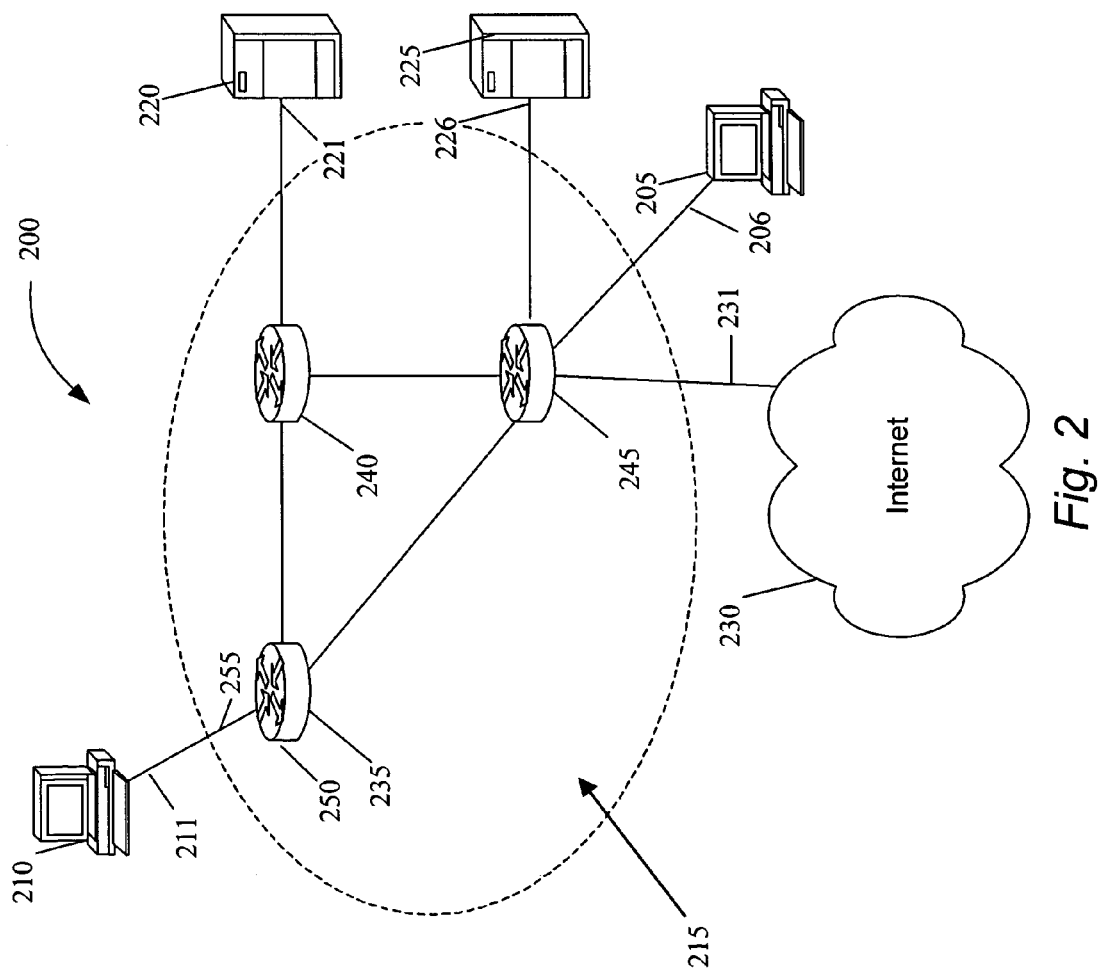
FIG. 2 is a network diagram that illustrates a customer network according to some implementations of the invention.

FIG. 2 illustrates a simplified yet more realistic setting for devices 105 and 125, according to some embodiments of the invention. Client SAN 200 includes network devices 235, 240 and 245, hosts 205 and 210, and storage devices 220 and 225. Those of skill in the art will appreciate that the types and numbers of devices shown in FIG. 2 are purely illustrative.

In one example, device 105 of FIG. 1 is a host device such as host 205 of FIG. 2. In some such implementations, the linked interface will be in switch 245 and will bring down link 206 when the tracked interface is in a "down" operational state. Alternatively, device 105 of FIG. 1 may be a storage device such as storage device 225. According to some such implementations, the linked interface will be in switch 245 and will bring down link 226 when the linked interface is in a "down" administrative state.

Figure 3:
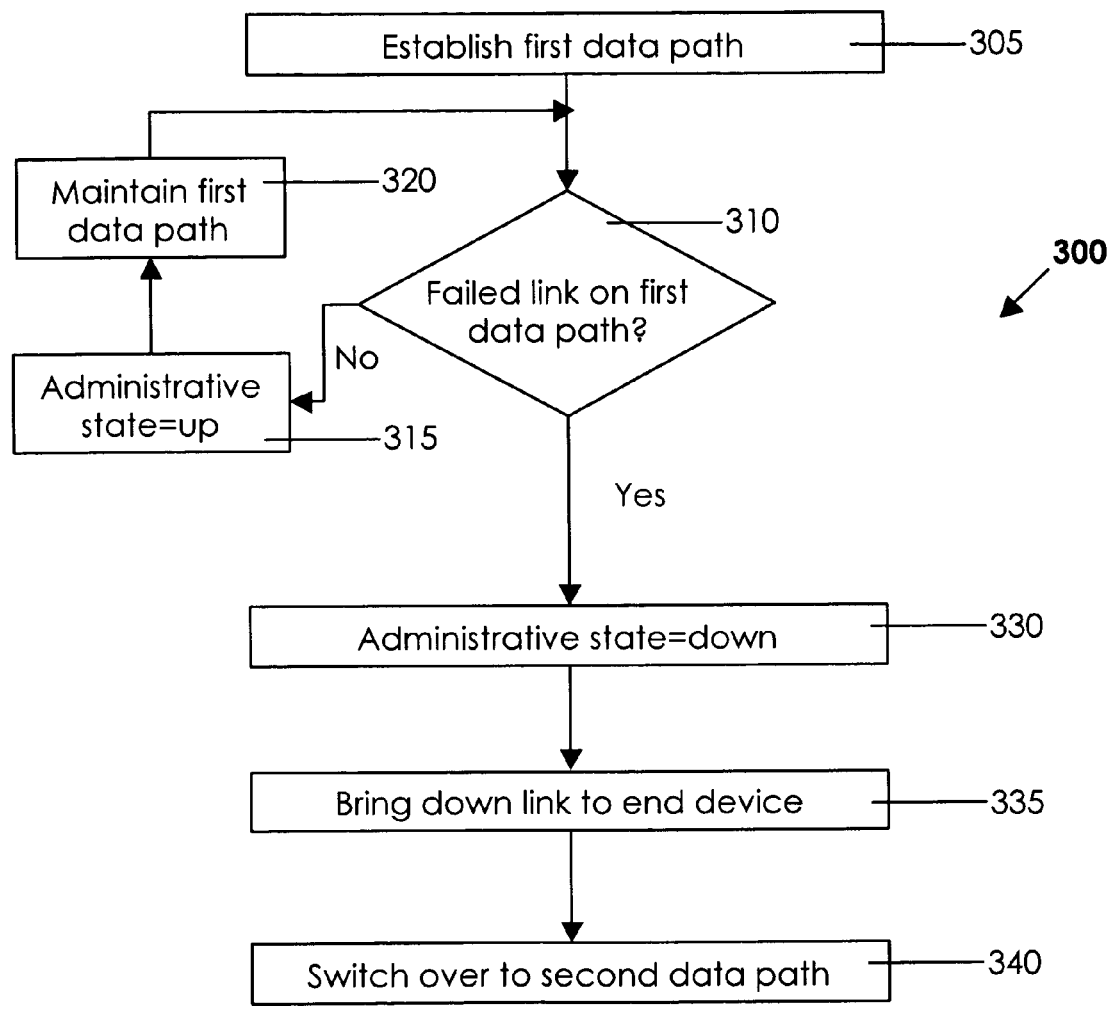
FIG. 3 is a flow chart that illustrates a method according to some implementations of the invention.

FIG. 3 is a flow chart that illustrates method 300 according to some implementations of the present invention. In step 305, a first data path is established between client devices in different geographic locations, e.g., path 140 between devices 105 and 125 of FIG. 1. The data path includes one or more linked interfaces and at least one tracked interface, which may be physical or virtual.

In step 310, it is determined whether a link on the first data path has failed (or will fail at some known time in the future). In some implementations, the determination is made directly, as in when the tracked interface is in the same network device as the linked interface. Alternative implementations, e.g., wherein the tracked interface is not in the same network device as the linked interface, will be discussed below.

In other implementations, the determination of step 310 may be made by direct communication of state information from another device, e.g., via information in a packet or frame header. As used herein, such a direct communication is also referred to as an "external indication." The external indication may indicate, for example, that a portion of the first data path has gone down or will be going down at some time in the future. For example, if a network administrator plans to perform an upgrade or maintenance on a device on data path 140, he or she could send a direct communication from a host device to a device having a linked interface (e.g., gateway 110), indicating that the device will be taken off-line at a particular time.

According to some implementations, an acknowledged messaging protocol (unicast, multicast, or broadcast) is used to signal neighboring network devices or a group of end devices that an element of an active network path is about to be taken down, thereby enacting the failover mechanism without requiring each end device to cycle through a "keepalive" timeout duration. In some such implementations, the message uses the standard TCP/IP frame format and has a payload that includes several pieces of information, such as: (1) the identity of the device sending the alert; (2) a message identifier indicating the nature of the message (i.e., going-down-now, going-down-in-future, protocol initialization, keepalive, etc); (3) a duration until the device is downed; (4) a device group ID; and/or (5) a protocol version ID.

In alternative implementations, the determination of step 310 is made by reference to the operational state of one or more tracked interfaces. If no link on the first data path has failed, the administrative state of the linked interface remains "up" (step 315) and the first data path is maintained (step 320).

However, according to some implementations, if a link on the first data path has failed, the administrative and/or operational state of the linked interface is set to "down" (step 330). As noted below, in alternative implementations a damping function is applied, wherein the administrative and/or operational state of the linked interface is not immediately set to "down" if a link on the first data path has failed. Moreover, in some implementations in which more than one interface is tracked, a weighting or similar function may be applied to determine whether the administrative and/or operational state of the linked interface is set to "down" in step 330.

After the administrative and/or operational state of the linked interface is set to "down," a link to an end device (e.g., link 130 to device 105) is brought down. This causes the end device to switch over to a redundant second data path, such as path 150 of FIG. 1. Because gateways 110 and 120 can detect a failure in path 140 in less time than a "keeaplive" timer period, the switchover will occur in less time than would be the case with prior art methods. This is true regardless of the protocol used to transfer data, the type of client device involved or the algorithm(s) used by, e.g., device 105 or device 125 to determine when path 140 would otherwise be brought down.

Figure 4:
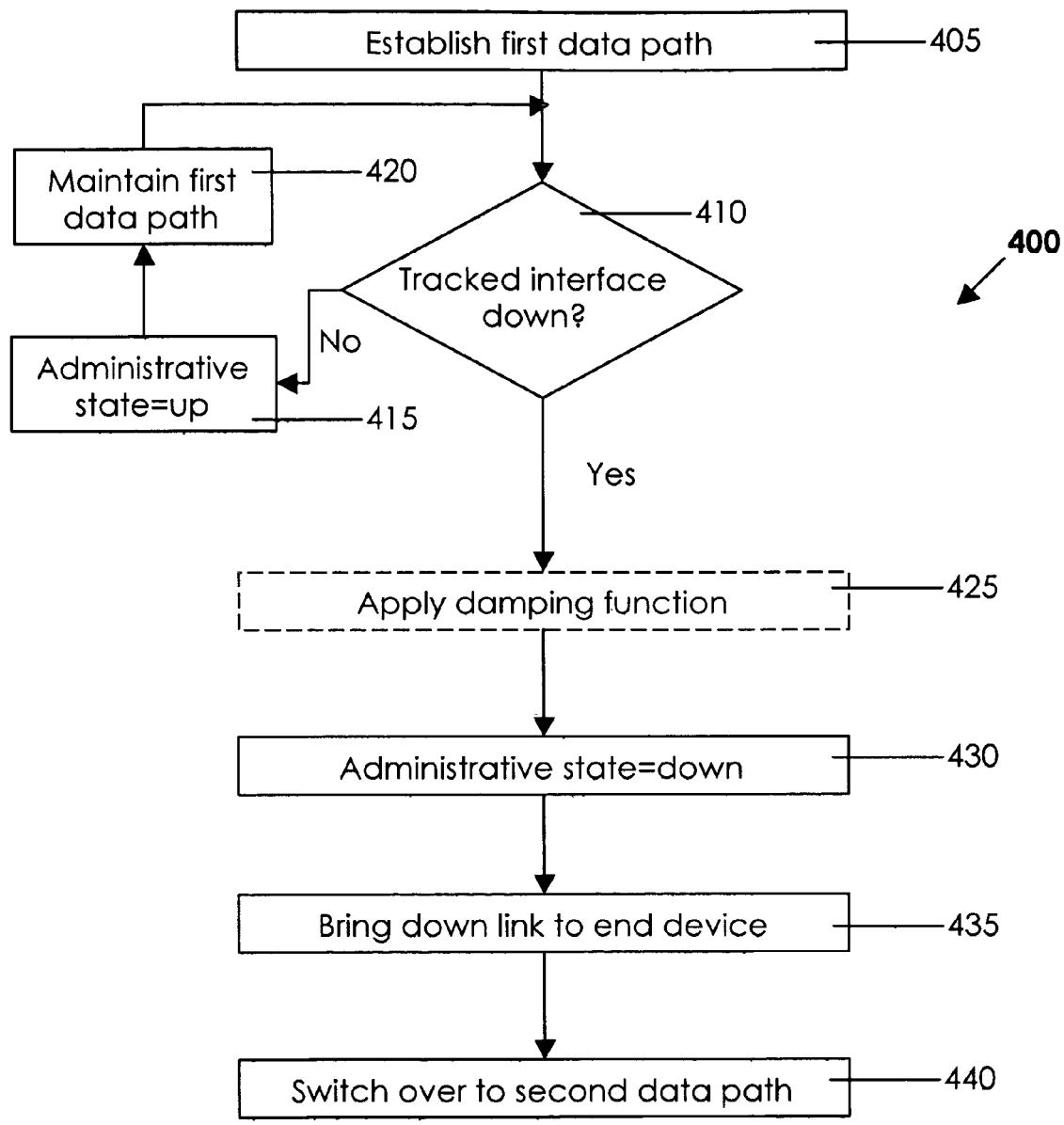
FIG. 4 is a flow chart that illustrates a method according to some implementations of the invention.

FIG. 4 is a flowchart that will be used to describe in more detail some of the interface-tracking implementations of the present invention. In step 405, a first data path is established between client devices in different geographic locations, e.g., path 140 of FIG. 1. As noted above, the data path includes a linked interface and at least one tracked interface, which may be physical or virtual. For example, the linked interface could be port 132 of gateway 110, as depicted in FIG. 1. Alternatively, the linked interface could be within another network device within the fabric of a SAN, such as network device 235 or 240 shown in FIG. 2. The tracked interface(s) may be in the same network device (e.g., port 136) or in another network device. For instance, if the linked interface is in network device 235 shown in FIG. 2, the tracked interface(s) could be in network device 245.

In step 410, it is determined whether a tracked interface (physical or logical) on the first data path has failed. According to method 400, the determination of step 410 is made by reference to the operational state of one or more tracked interfaces. If no link on the first data path has failed, the administrative state of the linked interface remains "up" (step 415) and the first data path is maintained (step 420).

In alternative implementations (e.g., wherein the tracked interface is not in the same network device as the linked interface), the determination of step 410 may be made indirectly. A determination that an interface has failed may be made by the communication of routing table information from the network device with the tracked interface to the network device with the linked interface. For example, there is often dynamic updating of routes in routing tables of network devices in a path. If the routing tables in the network devices of path 140 were dynamically updated, information regarding the failure of any of the links on path 140 would soon be reflected in all devices in the path. If, e.g., network device 170 failed, this information would pass via routing table updates to a routing table of network device 165, then to a routing table of network device 160 and then to a routing table of gateway 110. Such updates are typically made every 3 to 5 seconds.

Some network devices may be configured to support a novel frame format, known as Extended Inter-switch Link ("EISL") format, which is the subject of other pending patent applications assigned to Andiamo Systems. The description of some embodiments and applications of EISL in U.S. patent application Ser. No. 10/034,160 is hereby incorporated by reference for all purposes. In one example, the EISL format allows a single network device to process frames or packets having different formats. For example, a network device configured to support EISL may process both FC frames and Ethernet frames. The EISL format also supports VLANs, VSANs and similar features.

An EISL format allows the implementation of a fibre channel network with features and functionality beyond that provided by Inter-Switch Link ("ISL") format. In one example, the EISL format allows a port (known herein as a "trunking port") to transport frames of more than one format. For example, a trunking port can switch Ethernet and Fiber Channel ("FC") frames and is adaptable to transmitting frames of other formats as they are developed. An EISL header is used on EISL links to enable this transportation of different frame types. In another example, the EISL format allows the implementation of multiple virtual storage area networks (VSANs) on a single physical network.

Figure 5:
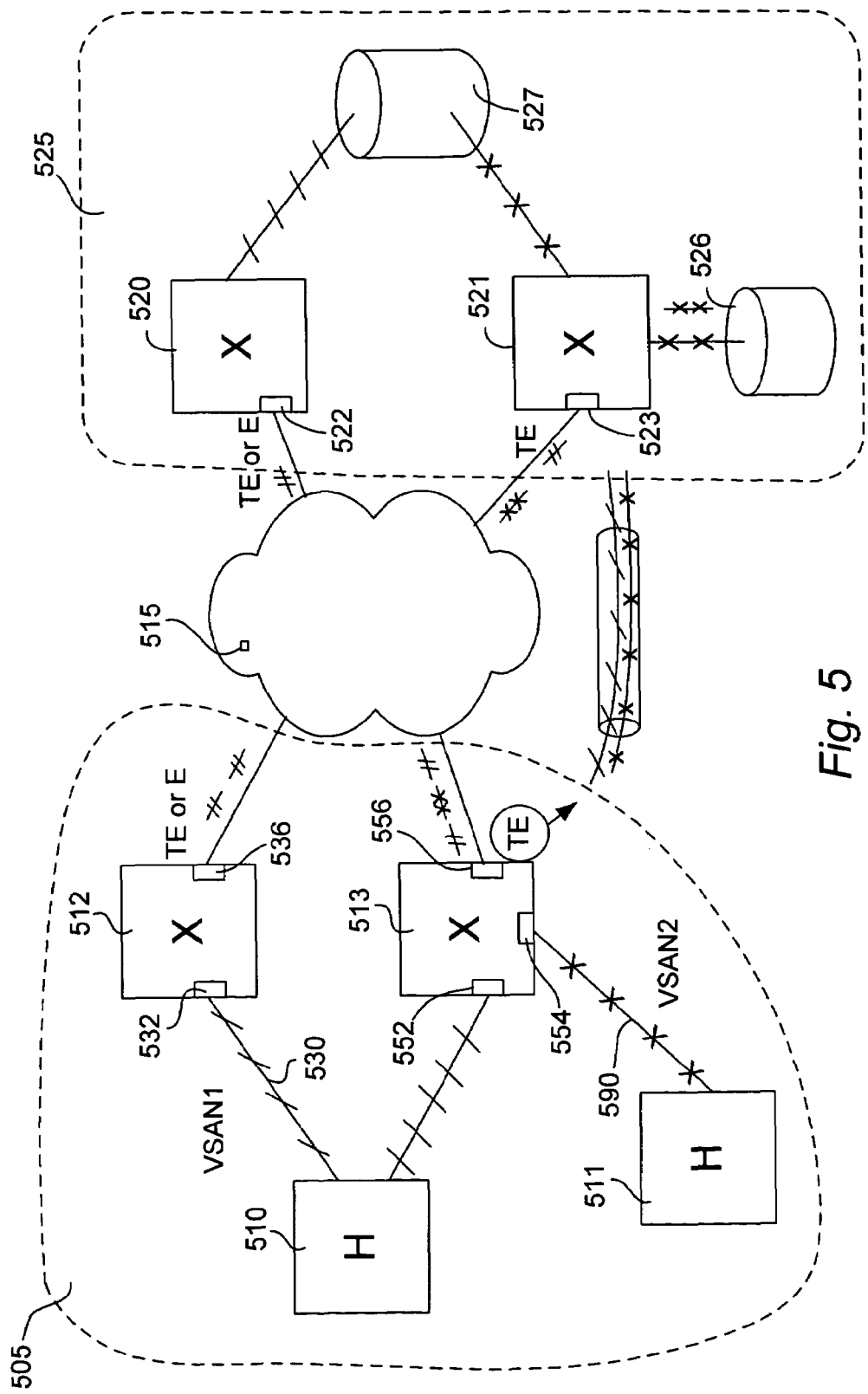
FIG. 5 is a network diagram that illustrates tracking one or more virtual interfaces according to some implementations of the invention.

Accordingly, a tracked interface may be a logical interface such as virtual SAN ("VSAN") number of a trunking port. Such logical tracked interfaces are shown in FIG. 5. Here, client network 505 includes hosts 510 and 511 and gateways 512 and 513. Client network 525 includes gateways 520 and 521, and storage devices 526 and 527. Network 515 connects client networks 505 and 525. Host 510 communicates with storage device 526 and storage device 527 via VSAN1. Host 511 communicates with storage device 526 and storage device 527 via VSAN2. In this example, port 556 of gateway 513 and port 523 of gateway 521 are TE ports capable of carrying traffic of both VSAN1 and VSAN2. Port 536 of gateway 512 and port 522 of gateway 520 could be TE ports or an E port, because they only carrying traffic for VSAN1.

If port 554 were a linked interface, tracked interfaces for VSAN2 could include ports 523 and 556. In this example, the state of the logical interfaces is tracked: if VSAN2 were turned off (e.g., by a network administrator), the administrative and/or operational state of linked interface 554 would become "down" (step 430) and physical link 590 would be dropped (step 435). This would be the case even if all physical links corresponding to the tracked logical interfaces were functioning. Bringing down link 590 could trigger host 511 to switch over to a redundant data path (not shown) in step 440.

In optional step 425, a damping function may be applied after determining that a tracked interface is down. This may be desirable to avoid bringing down a data path and causing a switchover when a tracked interface is down for only a short period of time.

Figure 6:
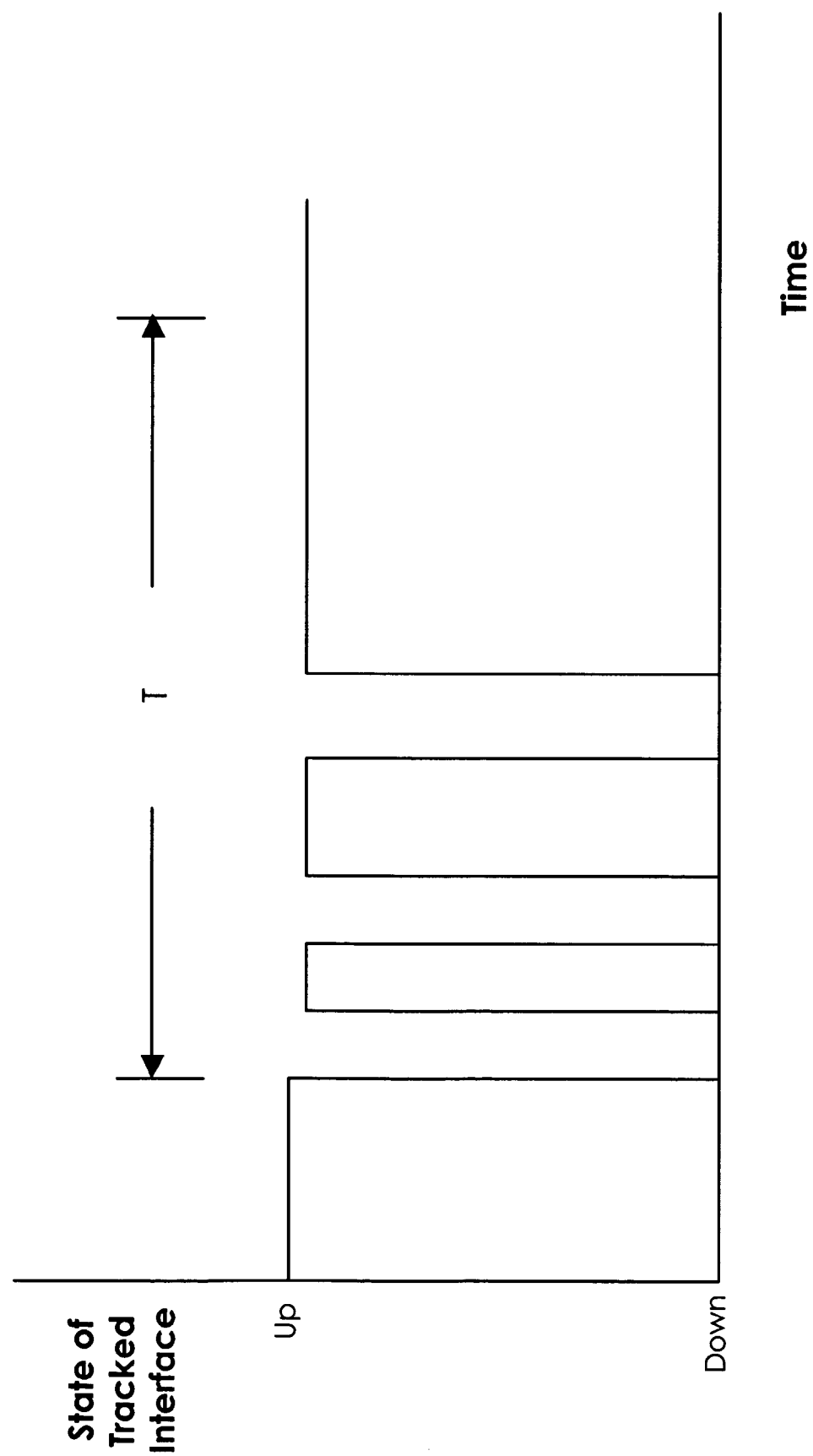
FIG. 6 is a graph that illustrates a damping method according to some implementations of the invention.

A basis for some such damping functions is shown in FIG. 6. Here, a tracked interface goes down 3 times within a period T. At the end of period T, the state of the tracked interface is "up." According to some damping functions, the administrative state of the linked interface is set to that of the tracked interface at the end of a predetermined period T. In other words, the administrative state of the linked interface would be set to "up" in the example shown in FIG. 6. According to other damping functions, the administrative state of the linked interface could be set according to the amount of time during period T that the tracked interface is up or down, the number of times that the tracked interface is down, etc.

Figure 7:
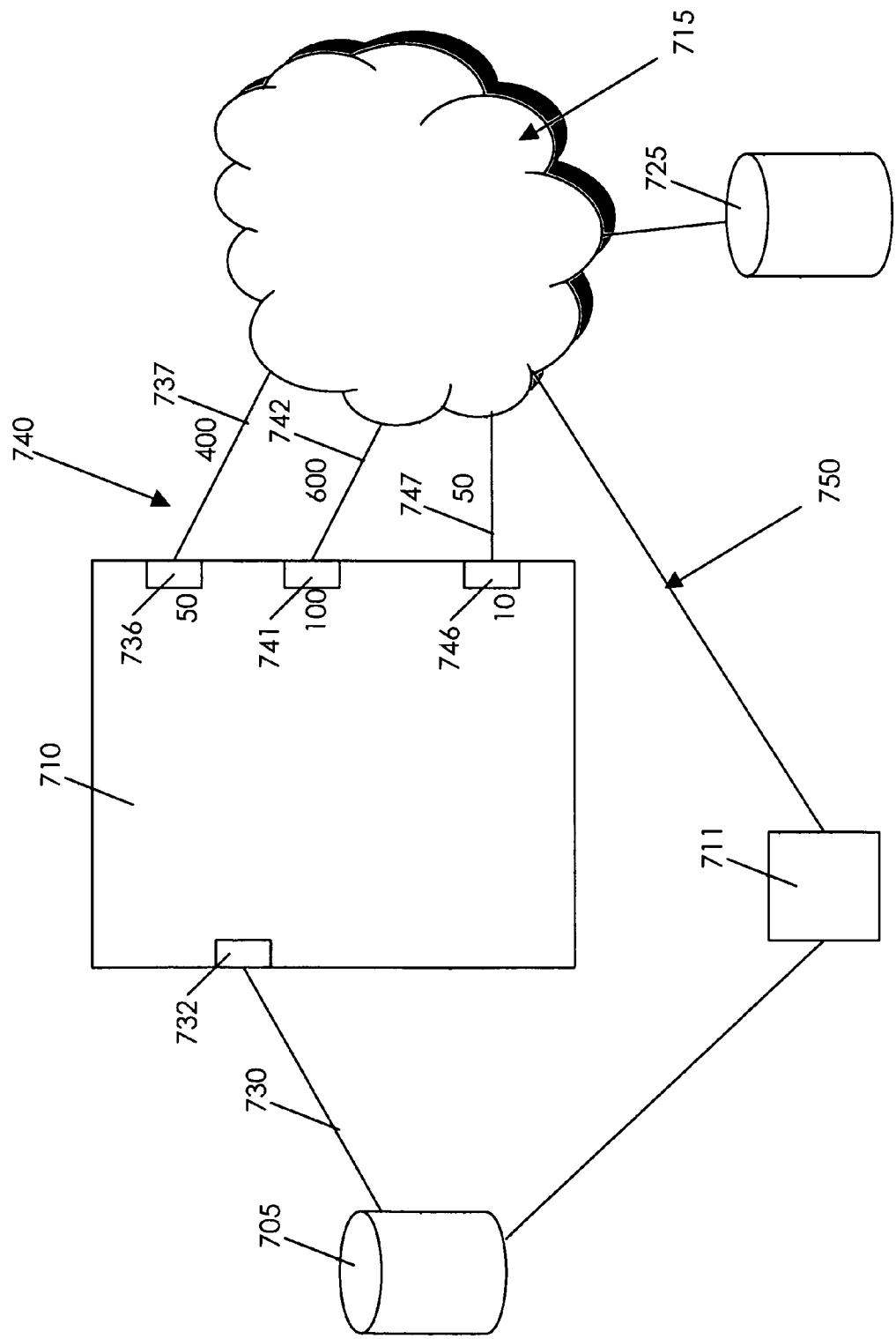
FIG. 7 is a network diagram that illustrates the tracking of multiple interfaces according to some implementations of the invention.

FIG. 7 depicts a situation in which first data path 740, which links device 705 in a first location and device 725 in a second location, includes parallel data paths having different data transmission rates. In this example, link 730 is capable of delivering data to gateway 710 at 1 Gbps. These data may be transmitted from gateway 710 to network 715 via three different pathways: path 737 has a transmission rate of 400 Mbps, path 742 has a transmission rate of 600 Mbps and path 747 has a transmission rate of 50 Mbps. Because path 747 has a relatively low data transmission rate, data path 740 could still provide acceptable transmission rates even if path 747 failed.

Therefore, in this example, a "metric" or weighting function is assigned to indicate the relative importance of links 737, 742 and 747. Here, link 737 is assigned a metric of 50, link 741 is assigned a metric of 100 and link 747 is assigned a metric of 10. These metrics may be regarded as being assigned to corresponding ports 736, 741 and 746 of gateway 710.

Figure 8:
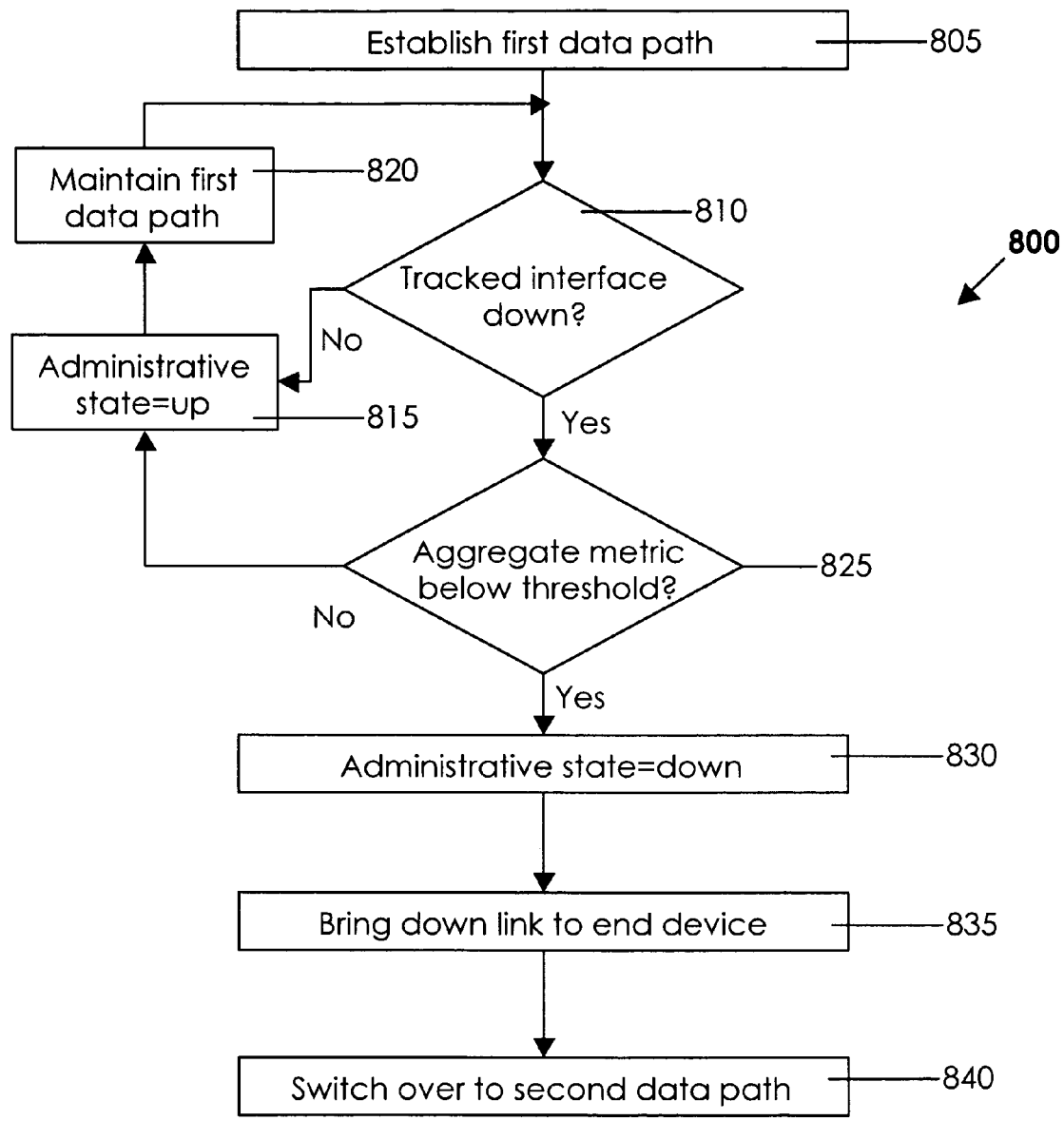
FIG. 8 is a flow chart that illustrates a method according to some implementations of the invention.

FIG. 8 illustrates the application of these metrics to method 800 of the present invention. Here, a first data path (e.g., path 740 of FIG. 7) is established in step 805. In step 810, it is determined whether a tracked interface is down. If so, it is then determined whether the aggregate metric of the tracked interfaces (e.g., ports 736, 741 and 746 of gateway 710) falls below a certain threshold (step 825). In this example, the administrative state of linked port 732 would be "down" (step 830) and link 730 would be dropped (step 835) if it were determined in step 825 that the total metric of links 737, 742 and 747 had dropped below a certain number, e.g., 100. If either link 737 or link 747 were to fail, path 740 would not be dropped. However, if link 742 were to fail, path 740 would be dropped and device 705 would switch over to redundant pathway 750 (step 840).

Figure 9:
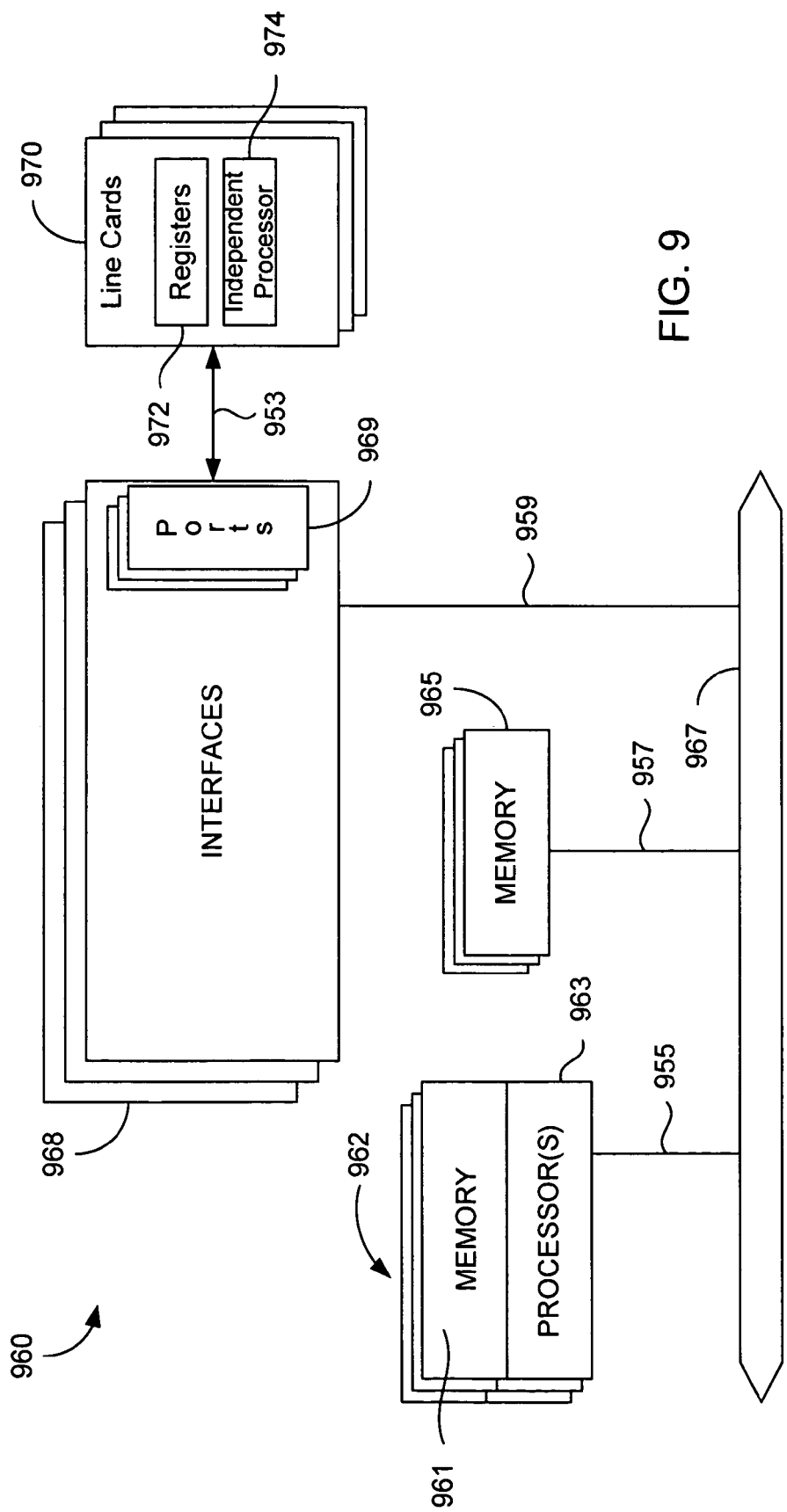
FIG. 9 illustrates a network device that may be used for implementations of the invention.

FIG. 9 illustrates an example of a network device that may be configured to implement some methods of the present invention. Network device 960 includes a master central processing unit (CPU) 962, interfaces 968, and a bus 967 (e.g., a PCI bus). Generally, interfaces 968 include ports 969 appropriate for communication with the appropriate media. In some embodiments, one or more of interfaces 968 includes at least one independent processor 974 and, in some instances, volatile RAM. Independent processors 974 may be, for example ASICs or any other appropriate processors. According to some such embodiments, these independent processors 974 perform at least some of the functions of the logic described herein. In some embodiments, one or more of interfaces 968 control such communications-intensive tasks as media control and management. By providing separate processors for the communications-intensive tasks, interfaces 968 allow the master microprocessor 962 efficiently to perform other functions such as routing computations, network diagnostics, security functions, etc.

The interfaces 968 are typically provided as interface cards (sometimes referred to as "linecards"). Generally, interfaces 968 control the sending and receiving of data packets over the network and sometimes support other peripherals used with the network device 960. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 962 may be responsible for implementing specific functions associated with the functions of a desired network device. According to some embodiments, CPU 962 accomplishes all these functions under the control of software including an operating system (e.g., Cisco IOS, a proprietary operating system developed by Cisco Systems, Inc., etc.) and any appropriate applications software.

CPU 962 may include one or more processors 963 such as a processor from the Motorola family of microprocessors or the MIPS family of microprocessors. In an alternative embodiment, processor 963 is specially designed hardware for controlling the operations of network device 960. In a specific embodiment, a memory 961 (such as non-volatile RAM and/or ROM) also forms part of CPU 962. However, there are many different ways in which memory could be coupled to the system. Memory block 961 may be used for a variety of purposes such as, for example, caching and/or storing data, programming instructions, etc.

Regardless of network device's configuration, it may employ one or more memories or memory modules (such as, for example, memory block 965) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 9 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/linecards may be bus based (as shown in FIG. 9) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

I claim:

1. A method of maintaining high availability in a network, the method comprising:
   determining that a virtual tracked interface has failed by examining an Extended Inter-switch Link (EISL) data frame, wherein the virtual tracked interface is a Virtual Storage Area Network (VSAN) interface, and if the virtual tracked interface is in a down state, dropping a corresponding physical link associated with the virtual tracked interface;
   determining that a first physical tracked interface has failed by examining routing table information from a network device having the first physical tracked interface, the first physical tracked interface forming a segment in a first data path between a first end device and a second end device;
   deriving a state of a linked interface of the network device from an operational state either of the virtual tracked interface or of the first physical tracked interface, wherein the linked interface and either the first physical tracked interface or the virtual tracked interface form part of the first data path between the first end device and the second end device;
   setting the state of the linked interface to the operational state of the first physical tracked interface or of the virtual tracked interface;
   applying a damping function to ensure that the state of the linked interface remains set to the virtual tracked interface state or to the first physical tracked interface state, thereby avoiding unnecessary switchover between the first data path and a second data path;
   notifying the first end device of the state of the linked interface; and
   switching to the second data path between the first end device and the second end device, thereby avoiding use of a keepalive message and shortening a time period needed for a keepalive timer period for switching to the second data path.

2. The method of claim 1, wherein the notifying step comprises notifying the end device of a failure in the first data path.

3. The method of claim 1, further comprising the step of deriving the state of the linked interface from the operational state of at least a second physical tracked interface.

4. The method of claim 1, wherein the linked interface state is an administrative state.

5. The method of claim 1, wherein the linked interface state is an operational state.

6. The method of claim 2, further comprising the step of switching to a second data pathway.

7. The method of claim 2, wherein the notifying step comprises bringing down the first data pathway.

8. The method of claim 3, wherein the linked interface state is determined by the use of a weighting function applied to at least the first physical tracked interface and the second physical tracked interface.

9. A network device, comprising:
   a first physical tracked interface having a first operational state;
   a virtual tracked interface having a second operational state and is a Virtual Storage Area Network interface;
   a linked port configured to derive a linked port state from the first operational state of the first physical tracked interface or from the second operational state of the virtual tracked interface, the linked port and either the first physical tracked interface or the virtual tracked interface, collectively forming part of a first data path between a first end device and a second end device, and also configured to notify the first end device when the linked port state is in a down state, thereby avoiding use of a keepalive message;
   a linked interface state-setting module configured to set the linked port state to the first operational state of the first physical tracked interface or to the second operational state of the virtual tracked interface;
   a damping function module to ensure that the linked port state should remain set to the first operational state of the first tracked interface or to the second operational state of the virtual tracked interface, thereby enabling the network device to prevent unnecessary switchovers between the first data path and a redundant data path; and a routing table storing network path data that is indicative of the quality of a network path and the availability of routes external of the first data path.

10. The network device of claim 9, wherein the first physical tracked interface is one of a Fibre Channel interface or an Ethernet interface.

11. The network device of claim 9, wherein the first physical tracked interface is part of the network device.

12. The network device of claim 9, wherein the first physical tracked interface is part of another network device.

13. The network device of claim 9, wherein the linked port is further configured to drop a connection with the first end device when the linked port state is a down state.

14. The network device of claim 9, wherein the linked port state is determined by applying a weighting function to the first tracked interface and a second tracked interface.

15. The network device of claim 9, wherein the linked port comprises a Fibre Channel port.

16. A method of maintaining high availability in a network, the method comprising:

receiving a signal indicating a condition of a first data path between a first end device having a first physical tracked interface with a first operational state and a second end device;

deriving a linked port state of a first network device from the signal, the linked port forming part of the first data path;

setting the linked port state to a second operational state of a virtual tracked interface, wherein the virtual tracked interface is a Virtual Storage Area Network interface;

applying a damping function to ensure that the linked port state remains set to the second operational state of the virtual tracked interface, thereby avoiding unnecessary switchover between the first data path and a redundant data path;

notifying the first end device of the linked port state; and updating a first routing table of the first end device and a second routing table of the second end device, wherein the first and second routing tables store network path data that indicates the quality of a network path and the availability of routes external of the first data path; and switching to the second data path between the first end device and the second end device, thereby avoiding use of a keepalive message.

17. The method of claim 16, wherein the condition of the receiving step indicates that the first data path is down.

18. The method of claim 16, wherein the condition of the receiving step indicates that the first data path will be down at a future time.

19. The method of claim 16, wherein the notifying step comprises dropping a link between the first network device and the first end device.

20. A device for maintaining high availability in a network, the device comprising:

means for determining that a virtual tracked interface has failed by examining an Extended Inter-switch Link (EISL) data frame, wherein the virtual tracked interface is a Virtual Storage Area Network (VSAN) interface, and if the virtual tracked interface is in a down state, dropping a corresponding physical link associated with the virtual tracked interface;

means for determining that a first physical tracked interface has failed by examining routing table information from a network device having the first physical tracked interface, the first physical tracked interface forming a segment in a first data path between a first end device and a second end device;

means for deriving a state of a linked interface of the network device from an operational state either of the virtual tracked interface or of the first physical tracked interface, wherein the linked interface and either the first physical tracked interface or the virtual tracked interface form part of the first data path between the first end device and the second end device;

means for setting the state of the linked interface to the operational state of the first physical tracked interface or of the virtual tracked interface;

means for applying a damping function to ensure that the state of the linked interface remains set to the virtual tracked interface state or to the first physical tracked interface state, thereby avoiding unnecessary switchover between the first data path and a second data path;

means for notifying the first end device of the state of the linked interface; and switching to the second data path between the first end device and the second end device, thereby avoiding use of a keepalive message.

* * * * *